W. H. MILLER.
AUTOMOBILE RADIATOR HEATER.
APPLICATION FILED JUNE 14, 1917.

1,260,238.

Patented Mar. 19, 1918.
2 SHEETS—SHEET 1.

Witnesses

Inventor
William H. Miller,
by C. A. Snow & Co.
Attorneys

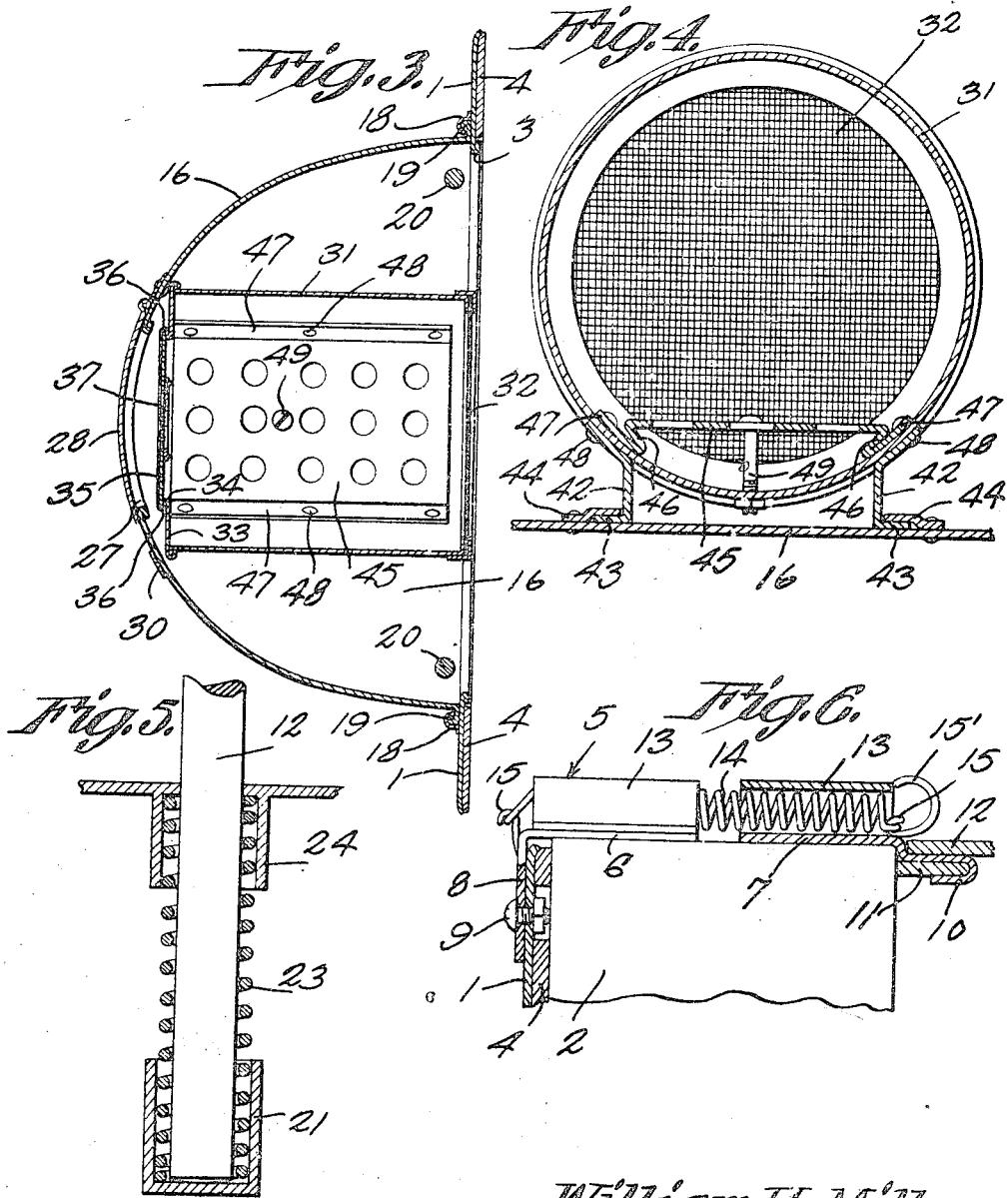

UNITED STATES PATENT OFFICE.

WILLIAM H. MILLER, OF CRAWFORDSVILLE, INDIANA, ASSIGNOR TO MILLER VEHICLE HEATER COMPANY, OF CRAWFORDSVILLE, INDIANA, A CORPORATION.

AUTOMOBILE-RADIATOR HEATER.

1,260,238.  Specification of Letters Patent.  Patented Mar. 19, 1918.

Application filed June 14, 1917.  Serial No. 174,800.

*To all whom it may concern:*

Be it known that I, WILLIAM H. MILLER, a citizen of the United States, residing at Crawfordsville, in the county of Montgomery and State of Indiana, have invented a new and useful Automobile-Radiator Heater, of which the following is a specification.

The present invention appertains to an appliance for heating the radiators of automobiles during cold weather, to prevent the water in the water circulating system from freezing, which if it occurs is apt to cause considerable damage not only to the radiator but to the engine and other parts as well.

It is the object of the invention to provide a novel and improved device applicable to various automobile radiators, and of such construction as to effectively carry out the desired functions.

Another object of the invention is the provision of an automobile radiator heater having novel means for holding the fuel, regulating the draft and directing the products of combustion to or through the radiator, the component parts being assembled in a novel manner.

A further object of the invention is the provision of a heating device, the body of which can be raised to provide sufficient clearance for cranking the machine, and the body also being removable easily when not wanted, as in the case of warm weather.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a front view of the device.

Fig. 2 is a vertical section thereof taken on the line 2—2 of Fig. 1, with the door closed.

Fig. 3 is a horizontal section taken on the line 3—3 of Fig. 1.

Fig. 4 is a vertical section taken on the line 4—4 of Fig. 2.

Fig. 5 is a sectional detail taken on the line 5—5 of Fig. 1, and

Fig. 6 is a sectional detail taken on the line 6—6 of Fig. 1.

The device embodies a vertical plate 1 adapted to rest against the face of an automobile radiator 2 and said plate can be made of any suitable shape and size to conform to the particular radiator to which it is to be applied. The plate 1 covers the face of the radiator, and is provided with a relatively large opening 3, and the plate 1 is preferably provided upon its rear face with felt or other packing 4 to bear against the radiator around the opening 3, whereby to prevent the marring of the radiator.

As a convenient means for detachably applying the plate 1 to the radiator, there are provided attaching devices 5, preferably two at each side. Each of the devices 5 embodies a pair of strips or sections 6 and 7, and the forward end of the strip 6 has an ear 8 extending at an angle and overlapping the outer face of the plate 1 and secured thereto by means of a bolt 9 or otherwise. The strips 6 and 7 bear against the respective side of the radiator 2, and the rear end of the strip 7 has an inwardly offset hook 10 to engage the rearwardly projecting flange 11 of the radiator against which the forward end of the hood 12 normally bears. The hook 10 being offset is adapted to accommodate the hood 12, as seen in Fig. 6. The strips 6 and 7 have longitudinal alining sleeves 13 for housing a coiled wire retractile spring 14 which has its ends engaged with hooks 15 or other suitable elements carried by the strips 6 and 7 at the remote ends of the sleeves 13. The spring 14 tends to pull the sleeves 13 and strips 6—7 toward one another, whereby when the hook 10 is engaged with the flange 11, the plate 1 will be pulled by spring tension tightly against the radiator, thereby preventing the plate 1 from rattling or vibrating, which would be objectionable. The strip 7 can be provided with a hook or other suitable means 15′ to enable the strip 7 to be pulled rearwardly when applying the hook 10 to the flange 11. It is evident that the strip or section 7 can be readily moved into and out of engagement with the radiator, when applying or removing the plate 1.

A semi-circular casing 16 of sheet metal or other suitable material is applied to the plate 1 in front of the opening 3, and is of a size to cover said opening, the casing 16 having an arcuate front wall whose ends terminate at the upright edges of the opening 3, and having a semi-circular top and bottom whose rear edges are above and below the horizontal edges of the opening 3. The casing 16 as well as the plate 1 can be ornamented in any desired manner, for purpose of appearance, and the rear portion of the casing 16 is open to communicate through the opening 3 with the radiator 2. This casing 16 is adjustable vertically and removable and for this purpose vertical slotted guides 18 are carried by the plate 1 adjacent to the upright side edges of the opening 3 and are adapted to receive vertical beads or flanges 19 with which the casing 16 is provided at its rear upright edges. When the casing is moved downwardly across the upper portion of the plate 1, the beads 19 are adapted to enter the guides 18, and then when the casing 16 is forced downwardly into position, the beads 19 in fitting within the guides 18 will hold the casing 16 firmly in place, and will enable it to be raised.

In order to automatically raise the casing 16 when it is released, as will presently appear, narrow vertical rods 20 are slidable through the bottom of the casing 16 near the rear corners thereof and their lower ends are seated in socket members 21 carried by the plate 1 below and near the lower corners of the opening 3. The rods 20 project upwardly within the casing adjacent to the sides thereof, and coiled wire expansion springs 23 surround the rods 20 and are confined between the bottom of the casing 16 and the socket members 21, whereby when the casing is released, the springs 23 will raise it by spring tension, to the position indcated by dotted lines in Fig. 1. The bottom of the casing is preferably provided with depending collars 24 receiving the upper ends of the springs 23, their lower ends being received by the socket members 21. A spring catch or latch 24' is carried by the bottom of the casing 16 at its rear edge, and is adapted to snap into engagement with a lug or keeper 25 with which the plate 1 is provided below the opening 3, so that when the casing 16 is forced downwardly into place, the catch 24 will snap into engagement with the keeper 25, thus holding the casing 16 in depressed position against the tension of the springs 23. This prevents a vibrating of the casing 16, and as soon as the catch 24 is released, the casing will be raised automatically by the springs 23. Stops 26 can be carried by the plate 1 below the opening 3 for the engagement and support of the bottom of the casing 16 when the casing is in lowered position.

The front of the casing 16 is provided with a door opening 27, and the door 28 for closing said opening is hinged to the casing 16, and is provided with a suitable latch 29 engageable with the keeper 30 carried by the casing 16 and for holding the door 28 closed, and enabling it to be conveniently opened for admitting air, for inserting fuel, or the like.

The heater proper embodies a horizontal longitudinal drum or fire box 31 disposed within the casing 16 and upon the bottom thereof in rear of the opening 27, the rear end of the drum 31 being open and having a meshed wire or other reticulated diaphragm 32 extending across the same to enable the products of combustion to flow from the combustion chamber within the drum 31 rearwardly to and through the radiator. The forward end wall 33 of the drum 31 has an opening 34 controlled by a door or damper 35 which is slidable vertically in the vertical guides 36 carried by the wall 33 at the opposite sides of the opening 34. The damper 35 has a central opening across which a mesh wire or reticulated diaphragm 37 extends, to admit air into the forward end of the combustion chamber. The damper 35 can be slid upwardly for increasing the draft, or for permitting fuel to be inserted into the drum when the door 28 is also opened. The damper 35 can be controlled even when the door 28 is closed, and for this purpose, a vertical rod 38 is slidable through the top of the casing 16 adjacent to the front wall thereof, and has a finger piece or ring 39 at its upper end. The lower end of the rod 38 has a hook 40 engaged transversely through a loop 41 carried by the damper 35 near its upper end. The hook 40 can be disengaged from the loop 41, to enable the drum 31 to be removed as will hereinafter appear.

The drum 31 is mounted removably upon the bottom of the casing 16, and for this purpose, longitudinal strips 42 are attached to the drum 31 at opposite sides and adjacent to the bottom thereof, and their lower edges have outturned flanges 43 seated upon the bottom of the casing and slid longitudinally forward under guide flanges 44 carried by the bottom of the casing 16. Thus, the drum 31 can be slid forwardly upon the bottom of the casing 16, the flanges 43 moving under the flanges 44, and consequently, when the rod 38 is disconnected from the damper 35, and the casing 16 removed from the radiator, the drum 31 can be withdrawn from the casing 16.

The drum 31 has a grate therein comprising a horizontal apertured plate 45 immediately above the bottom of the drum, the longitudinal side edges of the plate 45 being bent back, as at 46, to provide supports, and being bent back the second time to provide ears or flanges 47 bearing against the interior of the drum above the strips 42. Bolts 48 or other securing elements secure the flanges 47 to the drum 31 and also secure the strips 42 to the drum. It is also preferable to provide one or more bolts 49 connecting the central portion of the plate or grate 45 with the bottom of the drum 31 to hold the grate rigid.

Composition fuel or any other suitable fuel can be readily placed on the grate 45 when the door 28 and damper 35 are opened, the damper and door then being closed, but the damper can be left at any desired position to regulate the draft. The door 28 can also be opened for admitting air into and around the drum 31. The products of combustion and the heated air pass from the casing 16 and drum 31 into and through the radiator 2, to heat the same, and prevent the water freezing. Should the fan in rear of the radiator be in operation, it will serve to draw the products of combustion and heated air through the radiator and into the hood for heating the parts concealed under the hood. When the engine is cranked, the casing 16 which would ordinarily be in the way, can be raised by simply disengaging the catch 24¹ from the keeper 25, and then after the machine has been cranked, the casing 16 can be forced back into position. The casing 16 can also be removed during a warm spell of weather, when the heater is not necessary, but the plate 1 can be left upon the radiator and will not be objectionable.

The interior of the casing 16 can be lined with asbestos or other heat resisting material to prevent loss of heat.

Having thus described the invention, what is claimed as new is:—

1. A device of the character described embodying a plate to cover the face of a radiator and having an opening, a casing supported adjustably by the plate in front of said opening and having its rear portion open, and a heater supported within the casing.

2. A device of the character described, embodying a plate to cover the face of a radiator and having an opening, a casing having its rear portion open and connected detachably and adjustably with said plate in front of said opening, and a heater supported within the casing.

3. A device of the character described, embodying a plate to cover the face of a radiator and having an opening, a casing having its rear portion open to communicate with the radiator through the plate opening, a heater within the casing, and means for supporting said casing for vertical adjustment in front of the radiator.

4. A device of the character described, embodying a plate to cover the face of a radiator and having an opening, a casing having its rear portion open to communicate with the radiator through the plate opening, a heater within the casing, means for supporting said casing for vertical adjustment in front of the radiator, means for raising the casing, and means for holding it in lowered position.

5. A device of the class described, embodying a plate to cover the face of a radiator and having an opening, a casing in front of said opening and having its rear portion open, said plate and casing having interengageable means to enable the casing to move vertically, and a heater within the casing.

6. A device of the class described, embodying a plate to cover the face of a radiator and having an opening, a casing in front of said opening and having its rear portion open, said plate and casing having interengageable means to enable the casing to move vertically, a heater within the casing, means for raising the casing, and means for holding the casing in lowered position in front of said opening.

7. A device of the character described comprising a plate to cover the face of a radiator and having an opening, a casing carried by said plate in front of said opening and having its rear portion open, a heater within said casing, and attaching devices connected to the plate and having hooks to engage in the rear of the radiator and springs for pulling the plate and hooks toward one another.

8. A device of the character described embodying a plate to cover the face of a radiator and having an opening and vertical guides at the sides of said opening, a casing in front of said opening and having vertical portions engaging said guides, and a heater within the casing.

9. A device of the character described, embodying a plate to cover the face of a radiator and having an opening, a casing in front of said opening and having its rear portion open, the casing and plate having interengageable means for the vertical movement of the casing, a heater within the casing, socket members carried by the plate below said opening, vertical rods seated in said socket members and extending upwardly through the bottom of the casing, coiled wire expansion springs upon said rods and confined between the bottom of the casing and the socket members, and a catch for holding the casing in lowered position in front of said opening.

10. A device of the character described, comprising a casing having its rear portion open to communicate with a radiator and having a forward door, a heating drum within the casing and having its rear end open, a reticulated diaphragm extending across the rear end of said drum, and a damper for the forward end of said drum in rear of the aforesaid door.

11. A device of the character described, embodying a casing having its rear portion open and having a forward door, a longitudinal drum within the casing having its rear end open, said drum and bottom of the casing having interengageable means for holding the drum in place and permitting it to be withdrawn rearwardly, and a damper for the drum.

12. A device of the character described, embodying a casing having its rear portion open and having a forward door, a drum within the casing having its rear end open, a damper for the forward end of the drum in rear of said door, and a damper operating rod slidable through the casing and connected with the damper.

13. A device of the character described, embodying a casing having its rear portion open and having a forward door, a longitudinal drum within the casing having its rear end open, a reticulated diaphragm extending across the rear end of the drum, a grate within and supported by the drum, a damper for the forward end of the drum, the drum and bottom of the casing having means interengageable by a longitudinal movement of the drum, and means for operating the damper extending outwardly through the casing and detachable from the damper.

In testimony that I claim the foregoing as my own, I have hereto affixed my signature in the presence of two witnesses.

WILLIAM H. MILLER.

Witnesses:
 IVY E. SIMPSON,
 P. A. ROCKELLI.